US008744709B2

(12) United States Patent
Gauthier et al.

(10) Patent No.: US 8,744,709 B2
(45) Date of Patent: Jun. 3, 2014

(54) VEHICLE CLUTCH CONTROL METHOD

(75) Inventors: Jean-Philippe Gauthier, Sherbrooke (CA); Philippe Micheau, Sherbrooke (CA); Roger Rioux, Sherbrooke (CA); Maxime Desjardins-Goulet, Sherbrooke (CA)

(73) Assignee: Consortium de Recherche BRP—Universite de Sherbrooke S.E.N.C., Sherbrooke (CA)

( * ) Notice: Subject to any disclaimer, the term of this patent is extended or adjusted under 35 U.S.C. 154(b) by 0 days.

(21) Appl. No.: 13/996,677

(22) PCT Filed: Mar. 14, 2011

(86) PCT No.: PCT/CA2011/000277
§ 371 (c)(1),
(2), (4) Date: Jun. 21, 2013

(87) PCT Pub. No.: WO2012/083411
PCT Pub. Date: Jun. 28, 2012

(65) Prior Publication Data
US 2013/0275017 A1 Oct. 17, 2013

Related U.S. Application Data

(60) Provisional application No. 61/426,846, filed on Dec. 23, 2010.

(51) Int. Cl.
G06F 7/00 (2006.01)
(52) U.S. Cl.
USPC .............................................. 701/68

(58) Field of Classification Search
None
See application file for complete search history.

(56) References Cited

U.S. PATENT DOCUMENTS

| 4,727,966 | A  | * | 3/1988  | Hiramatsu et al. ............. 477/35 |
|-----------|----|---|---------|--------------------------------------|
| 7,037,239 | B2 |   | 5/2006  | Werner et al.                        |
| 7,356,400 | B2 |   | 4/2008  | Honma et al.                         |
| 2008/0254938 | A1 |   | 10/2008 | Sladek                            |
| 2011/0240428 | A1 | * | 10/2011 | Fujikane et al. ............. 192/3.28 |
| 2013/0245901 | A1 | * | 9/2013  | Arai ............................... 701/51 |
| 2013/0291830 | A1 | * | 11/2013 | Doering et al. ............... 123/350 |

OTHER PUBLICATIONS

International Search Report of PCT/CA2011/000277; Robert Gruber; Aug. 25, 2011.

* cited by examiner

Primary Examiner — Thomas Tarcza
Assistant Examiner — Adam Alharbi
(74) Attorney, Agent, or Firm — BCF LLP

(57) ABSTRACT

A vehicle has an engine having a crankshaft, a hydraulically controlled multi-plate clutch operatively connected to the crankshaft, and an output shaft operatively connected to the clutch. The clutch selectively transmits power from the crankshaft to the output shaft. A propulsion element is operatively connected to the output shaft. A hydraulic fluid supply system is fluidly connected to the clutch for supplying pressurized hydraulic fluid to the clutch. A controller is connected to the hydraulic fluid supply system. The controller receives a torque signal indicative of engine torque and controls the hydraulic fluid supply system based at least in part on the torque signal. A clutch control method and system are also disclosed.

21 Claims, 11 Drawing Sheets

VEHICLE CLUTCH CONTROL METHOD

CROSS-REFERENCE

The present application claims priority to U.S. Provisional Patent Application No. 61/426,846, filed Dec. 23, 2010, the entirety of which is incorporated herein by reference.

FIELD OF THE INVENTION

The present invention relates to a method of controlling a clutch for a vehicle and to vehicles having a clutch.

BACKGROUND

Many motorized wheeled vehicles use one or more clutches to engage and disengage the engine from the transmission when shifting gears. In some cases to control the transfer of torque from the engine to the transmission and/or to the wheels.

One type of commonly used clutch it the multi-plate clutch in which alternating driving and driven plates are compressed together to transmit torque from the engine. To control the activation of such a clutch, a clutch controller typically compares the speed of rotation of the driving plates, which can obtained from the engine for example, to the speed of rotation of the driven plates, which can be obtained from the speed of rotation of a driveshaft connected to one or more wheels for example. By comparing these speeds of rotation, the controller can determine if the clutch is slipping (i.e. the speed of rotation of the driving plates is different from the speed of rotation of the driven plates), or is synchronized (i.e. the speeds of rotation of the driving and driven plates are the same), and can make adjustments accordingly.

While this clutch control method is suitable, since the controller relies on a clutch output (i.e. the speed of rotation of the driven plates) to control the clutch, there is an inherent delay in the controller's response.

Therefore, there is a need for a clutch control method with improved controller response.

The clutch controller usually uses one or more algorithms and/or control maps to control the clutch. These algorithms and maps are based on a desired performance characteristic for the hardware being used, such as the type of clutch. Since the same algorithms and maps are used for multiple vehicles of the same model, in order to keep performance and response levels the same for all these vehicles, manufacturing tolerances need to be small. For example, in order for the clutches being used in the vehicles to provide the same response, when assembling a clutch, once all of the driving and driven plates but one have been assembled, the thickness of the stack of plates is measured, and the last plate is selected from plates of different thicknesses such that once the last plate is assembled, the overall thickness of the stack of plates corresponds to the desired stack thickness. As would be understood, this is time consuming and complicates the manufacturing process of the clutch.

Also, should a user replace a piece of hardware with one which is different from the one originally provided by the original manufacturer, the performance is likely to be affected as the algorithms and maps were not designed for this particular piece of hardware. Examples of this include replacing a clutch with a similar clutch but from an aftermarket manufacturer due to wear or damage of the original clutch, or in the case of a hydraulically actuated clutch, changing the type of fluid used to actuate and/or lubricate the clutch could also affect performance.

Additionally, should the manufacturer want to use the same hardware across different models but provide these models with different performance characteristics, then completely new algorithms and maps need to be developed.

Also, with use, the hardware, such as the clutch, wears down, but the controller does not take into account these changes which can also affect performance.

Therefore, there is a need for a clutch control system which is less sensitive to variations resulting from manufacturing processes, simplifies modifications to be made to the algorithms and maps necessary to take into account changes in desired performance level and hardware, and can take into account normal wear of the components.

Wheeled vehicles having a manual transmission such as some cars typically used normally closed clutches where one or more springs cause compression of the driving and driven plates together. As such, normally closed clutches transmit torque even when no actuation power is provided. Wheeled vehicles having an automatic transmission such as some cars use a torque converter as a device to execute takeoff. As a result, when the car is in gear (i.e. not in neutral), when the driver does not actuate the accelerator pedal and also does not actuate the brake pedal, the car will nonetheless move forward since the torque converter transmits a residual torque to the wheels. This is sometimes referred to as vehicle creep. However, in some types of vehicles, such as motorcycles for example, vehicle creep is not desired. One solution consists in using a normally opened clutch where one or more springs cause the driving and driven plates to be normally spaced apart. Although this eliminates creep, it causes a lag in the actuation of the clutch when the driver needs torque to be transmitted to the wheels.

Therefore, there is a need for a clutch control method which reduces the above-mentioned lag resulting from the use of a normally opened clutch.

Finally, in hydraulically actuated clutches the pressure of the hydraulic fluid supplied to the clutch determines if the driving and driven clutch plates are slipping relative to one another or are synchronized. However, for a given method of controlling the clutch's hydraulic fluid supply system, different hydraulic fluid viscosities will result in different hydraulic fluid pressures being supplied to the clutch, thus resulting in different performances. One of the factors affecting hydraulic fluid viscosity is the temperature of the hydraulic fluid.

Therefore, there is a need for method of controlling a clutch which accounts for variations in temperature of the hydraulic fluid.

SUMMARY

It is an object of the present invention to ameliorate at least some of the inconveniences present in the prior art.

The present provides a method of controlling a hydraulically controlled multi-plate clutch based at least in part on the engine torque. As the engine torque is an input to the clutch, the clutch controller using the engine torque as input to the control of the clutch can react more quickly to changes of conditions requiring modification of the transmitted clutch torque.

The present also provides a control system for operating a hydraulically controlled multi-plate clutch which separates the control of the clutch in two portions. The first portion consists of a vehicle behaviour controller. The vehicle behaviour controller determines the desired clutch torque (i.e. the torque output of the clutch) based at least on the engine torque, independently of the type of hardware (clutch, valves, etc.) being used. The second portion consists of a hydraulic pressure controller. The hydraulic pressure controller includes one or more mathematical models and/or maps based one the hardware being used. For example, there could be a model for the clutch and a model for the valve used in the hydraulic fluid supply system. The hydraulic pressure controller takes the desired clutch torque as input to the models and/or maps and determines how the hydraulic fluid system should be controlled in order to obtain the desired clutch torque from the clutch.

By separating the control in two portions as described above, when the same vehicle behaviour is desired but for different hardware, only the hydraulic pressure controller needs to be modified or only one or more models and/or maps need to be modified. For example, if two different vehicle models use different clutches, but the same vehicle behaviour is desired for both models, then only the mathematical model of the clutch used in the hydraulic system controller need to be changed.

Similarly, when the same hardware is being used in two different vehicle models, such as a touring and a sport model for example, but different vehicle behaviours are desired for the two models, then only the vehicle behaviour controller needs to be modified and the hydraulic pressure controller can remain the same for both models In order to account for the wear of the components or for the change of components after initial manufacturing, the hydraulic pressure controller is provided with adaptation components which compare the actual outputs from the hardware, clutch and hydraulic pressure for example, to the desired outputs from the hardware. Should there be a difference between the desired and actual outputs, then the adaptation components update the various models and/or maps such that the difference is eliminated, or at least reduced. The adaptation components are also used to adapt the models and/or maps, which are initially designed for a component (i.e. clutch, valve . . . ) having specific characteristics, to match the specific characteristics of the component installed in the vehicle. As such, the adaptation components will take into account variations resulting from manufacturing tolerances, such that even if components installed into two different vehicles are not perfectly identical, the controller will ensure that their performance is identical. As a result, manufacturing tolerances of the components do not need to be as tight and they do not need to be corrected as described above (i.e. by the measurement of the clutch plate stack for example).

In a similar manner, the hydraulic pressure controller accounts for variations in temperature of the hydraulic fluid by reducing the hydraulic pressure being applied to the clutch as the temperature of the hydraulic fluid decreases.

The present also provides a method of controlling a normally opened hydraulically controlled multi-plate clutch in order to reduce the above-mentioned lag in actuation of the clutch. As the clutch is biased to a normally opened position by a spring, it is possible to establish a correlation between the pressure being applied to the clutch and a displacement of a clutch piston. By knowing this correlation it is possible to know the amount of pressure necessary to bring the piston to a position corresponding to the clutch kiss-point or a position near the clutch kiss-point. The clutch kiss-point is the point at which the clutch driving and driven plates start touching each other. When the engine is running but the vehicle is not in movement, the method controls the pressure supplied to the clutch such that the clutch is at or near the clutch kiss-point. Therefore, when the driver operates the vehicle so as to initiate movement of the vehicle, very little displacement of the clutch piston is necessary to engage the clutch driving and driven plates to transmit torque from one to the other, and the response time between the driver input and the transmission of torque to the wheels is short.

The present also provides a vehicle using a clutch control method and system as described above.

The present provides a vehicle having an engine having a crankshaft, a hydraulically controlled multi-plate clutch operatively connected to the crankshaft, and an output shaft operatively connected to the clutch. The clutch selectively transmits power from the crankshaft to the output shaft. A propulsion element is operatively connected to the output shaft. A hydraulic fluid supply system is fluidly connected to the clutch for supplying pressurized hydraulic fluid to the clutch. A controller is connected to the hydraulic fluid supply system. The controller receives a torque signal indicative of engine torque and controls the hydraulic fluid supply system based at least in part on the torque signal.

The present also provides a method of operating a hydraulically controlled multi-plate clutch selectively transmitting torque from an engine of a vehicle to a propulsion element of the vehicle. The method comprises: determining an engine torque; determining a clutch torque to be transferred by the clutch based at least in part on the engine torque; determining a hydraulic pressure to be applied to the clutch based on the clutch torque; and applying the hydraulic pressure to the clutch.

The present also provides a control system for operating a hydraulically controlled multi-plate clutch selectively transmitting torque from an engine of a vehicle to a propulsion element of the vehicle. The system has a vehicle behaviour controller determining a desired clutch torque to be applied to the clutch based at least in part on engine torque; and a hydraulic pressure controller determining a control signal to be sent to a hydraulic fluid supply system to control the hydraulic fluid supply system to supply hydraulic fluid to the clutch at a pressure resulting in the desired clutch torque being provided by the clutch. The hydraulic fluid supply system includes a hydraulic fluid pump and a valve. The control signal is determined based on the desired clutch torque and an inverse model of at least one of the clutch and the valve.

Embodiments of the present invention each have at least one of the above-mentioned features, but do not necessarily have all of them. It should be understood that some aspects of the present invention may satisfy objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present invention will be described with respect to a three-wheel vehicle. However, it should be understood that other types of vehicles such as, for example, road and off-road motorcycles, four-wheel all-terrain vehicles and snowmobiles are also considered.

Figure 1:
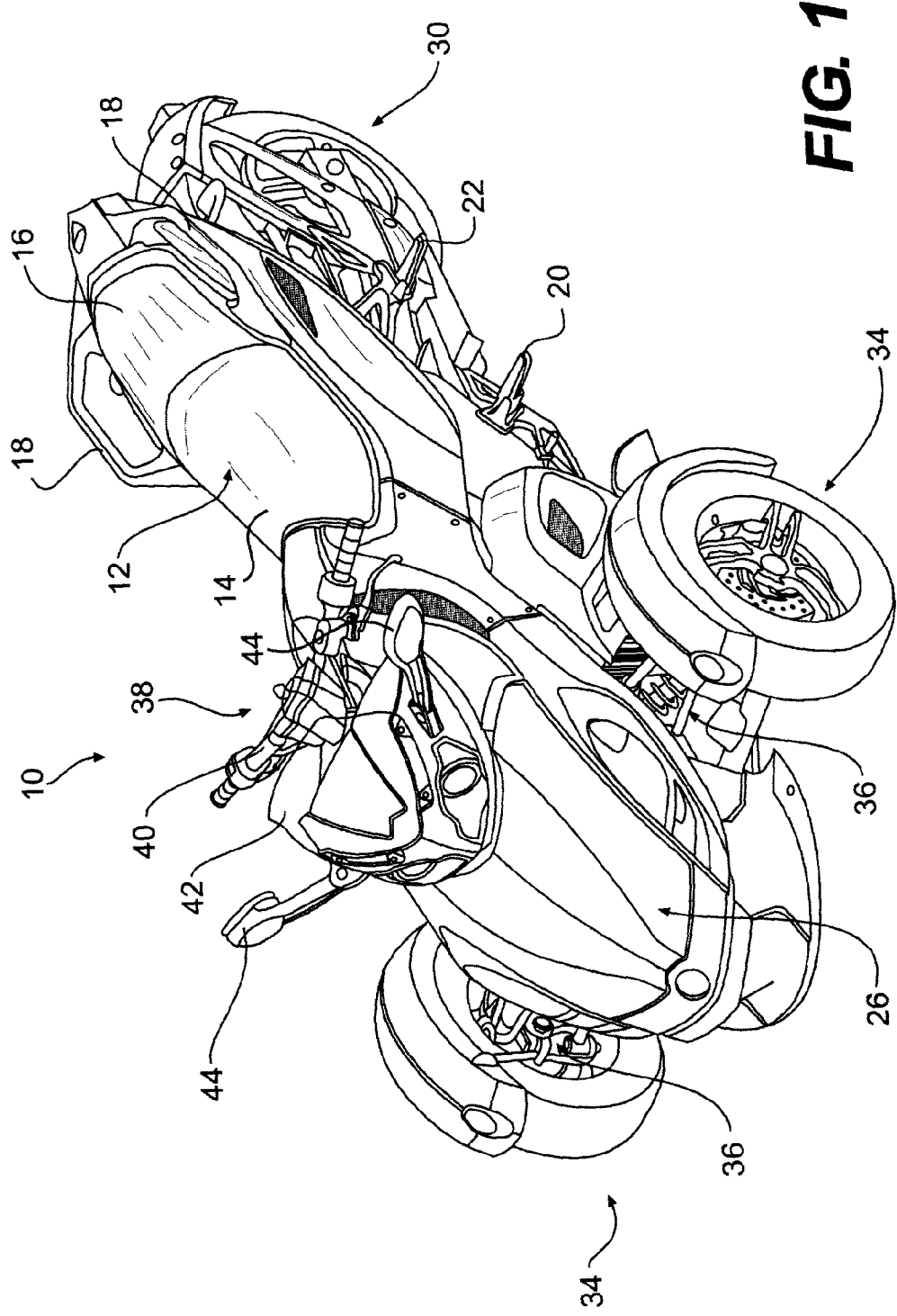
FIG. 1 is a perspective view taken from a front, left side of a three-wheel vehicle.

A three-wheel vehicle 10 will be described with reference to FIGS. 1 to 3. The three-wheel vehicle 10 is a straddle-type vehicle comprising a straddle seat 12 adapted to accommodate two adult sized riders. The straddle seat 12 includes a forward seat portion 14 for the driver and a rear seat portion 16 for a passenger. A pair of handles 18 are provided on both sides of the rear seat segment 16 for the passenger sitting thereon to grip with his hands. A pair of foot pegs 20 and a pair of foot pegs 22 are used by the driver and the passenger respectively, for resting their feet onto during riding. It is contemplated that the three-wheel vehicle 10 could not have the rear seat portion 16, and be adapted to accommodate only the driver and that accordingly the three-wheel vehicle 10 would not have the handles 18 and would have only the pair of foot pegs 20.

Figure 2:
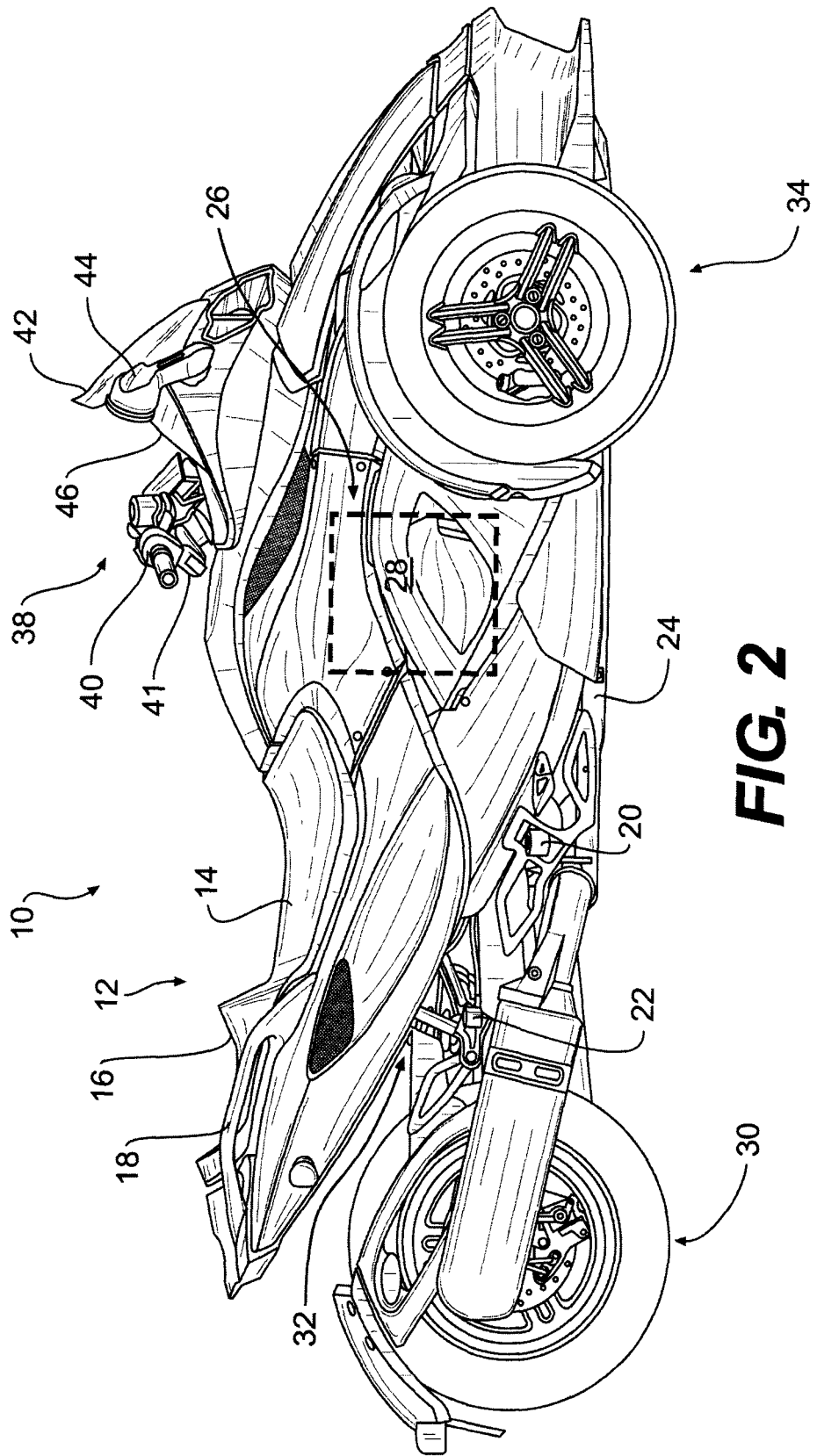
FIG. 2 is a right side elevation view thereof.
Figure 3:
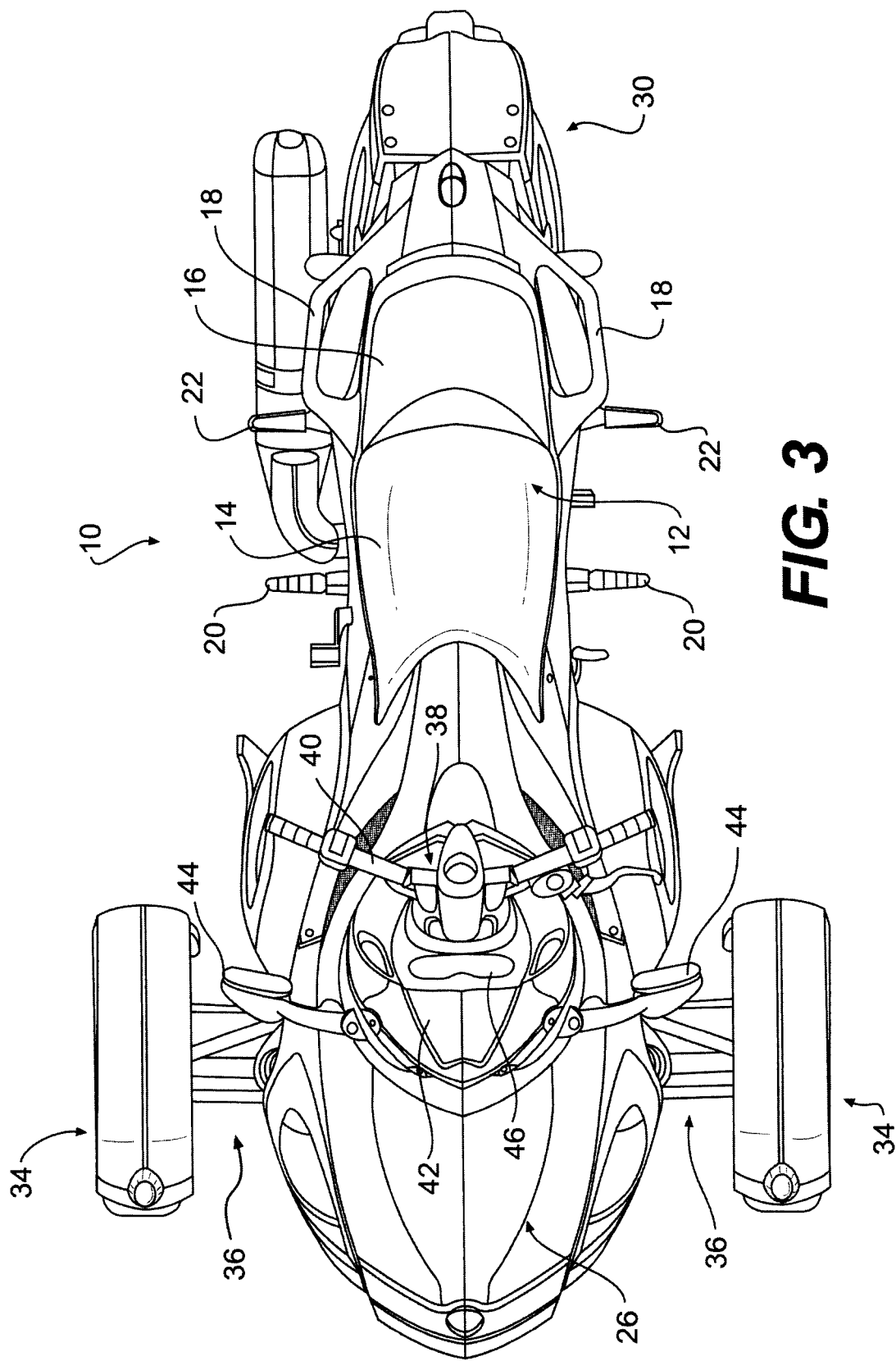
FIG. 3 is a top elevation view thereof.

The three-wheel vehicle 10 includes a frame 24 (a portion of which is shown in FIG. 2) underneath the body panels 26 of the vehicle 10. The frame 24 supports and houses an engine 28 (schematically shown in FIG. 2). The engine 28 is a four-stroke internal combustion engine, but other types of engines are contemplated. A single rear wheel 30 with a tire suitable for road use is suspended from the vehicle 10 via a rear suspension system 32 (FIG. 2) at the rear of the frame 24. A pair of front wheels 34 are suspended from the front of the frame 24 through a suitable suspension assembly 36 such as a double A-arm suspension assembly. The front wheels 34 have road tires mounted thereon.

A steering assembly 38 is coupled to the front wheels 34 and is supported by the frame 24 for transmitting steering commands to the front wheels 34. The steering assembly 38 includes a steering column (not shown) and a handlebar 40. A throttle lever 41 (FIG. 2) is disposed at one end of the handlebar 40 to allow the driver to control a speed of the vehicle 10. A windshield 42 is mounted forwardly of the handlebar 40. A pair of rear view mirrors 44 are mounted on either side of the windshield 42. A dashboard 46 is disposed between the handlebar 40 and the windshield 42.

The three-wheel vehicle 10 is provided with many other components and features which would be known to a person skilled in the art such as a fuel system, an exhaust system, a lubrication system, head and tail lights. As such these components and features will not be described herein in detail. However, it should be understood that the vehicle 10 is nonetheless provided with such components and features.

Figure 4:
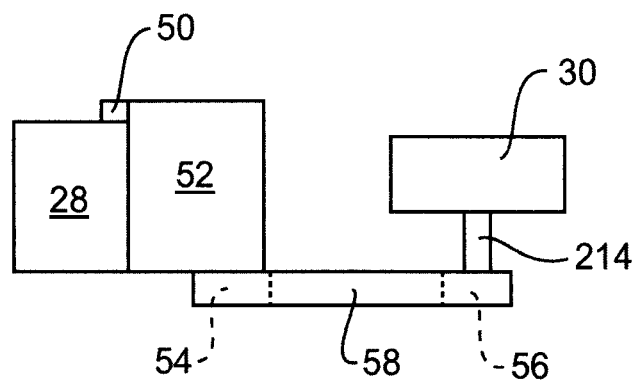
FIG. 4 is a schematic representation of a drive train of the vehicle of FIG. 1.

Turning now to FIG. 4, a drive train of the vehicle 10 will be described. The engine 28 drives a hydraulically controlled multi-plate clutch 50. The clutch will be described in more detail further below. The clutch 50 selectively transmits torque from the engine 28 to a transmission 52 of the vehicle 10. The transmission 52 is a semi-automatic transmission, but it is contemplated that an automatic transmission could be used. It is contemplated that the clutch 50 could be integrally formed with the engine 28 or the transmission 52. The transmission 52 drives a driving sprocket 54. The driving sprocket 54 drives a driven sprocket 56 via a chain or belt 58. The driven sprocket 56 drives the rear wheel 30. It is contemplated that the transmission 52 could be omitted and the clutch 50 could be connected directly to the driving sprocket 54. As should be understood, in different types of vehicles the engine 28 would drive the wheel(s) or other propulsion element, such as the track in a snowmobile, through a suitable drive train.

As mentioned above, the clutch 50 is a hydraulically driven multi-plate clutch 50. As such, the clutch 50 is engaged and disengaged by applying hydraulic pressure to a piston 60 of the clutch 50. The clutch 50 is a normally opened clutch 50, which means that when no, or only a small amount of pressure is applied, the clutch 50 is disengaged. Springs 62 bias the clutch toward the disengaged (i.e. open) position. When hydraulic pressure is applied, the piston 60 pushes the plates of the clutch 50 together, as described in greater detail below, thus causing the clutch 50 to transmit torque from the engine 28 to the transmission 52.

Figure 5:
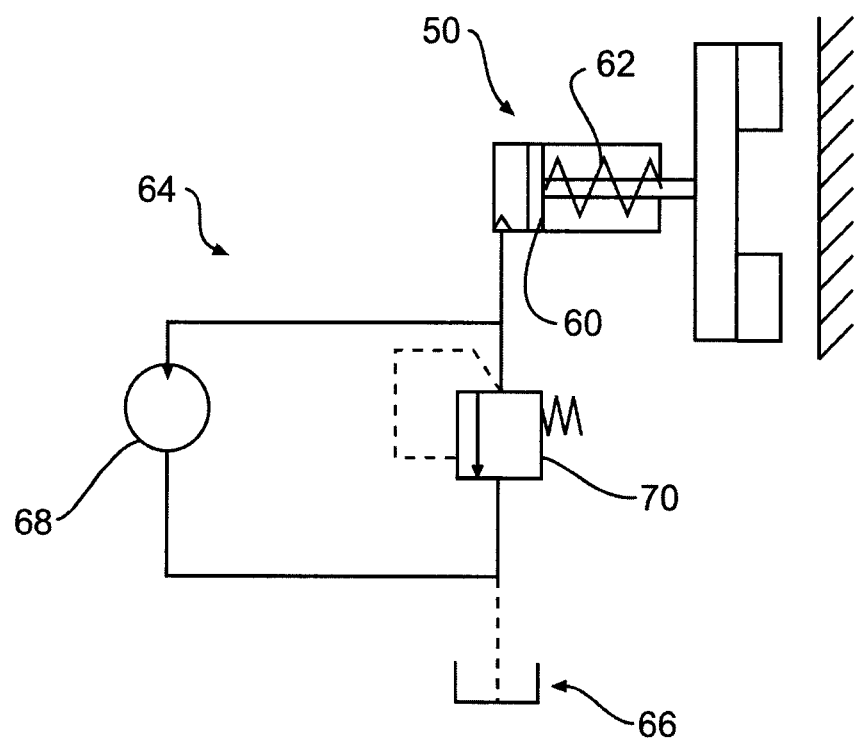
FIG. 5 is a schematic representation of a hydraulic fluid supply system for a clutch of the vehicle of FIG. 1.

To supply hydraulic pressure to the clutch 50, a hydraulic fluid supply system 64 is provided. The hydraulic fluid supply system 64 is schematically illustrated in FIG. 5. The hydraulic fluid supply system 64 includes a hydraulic fluid reservoir 66, a hydraulic fluid pump 68, and a valve 70. The hydraulic fluid used in the present embodiment to actuate and lubricate the clutch 50 is the oil used to lubricate the engine 28. As such the hydraulic fluid reservoir 66 is the oil tank of the engine 28. However, it is contemplated that the hydraulic fluid system 64 could be completely independent of the lubrication system of the engine 28 and use a hydraulic fluid other than engine lubricant to both actuate and lubricate the clutch 50. It is also contemplated that the hydraulic fluid system 64 could be completely independent of the lubrication system of the engine 28 and use a hydraulic fluid other than engine lubricant to actuate the clutch 50, and that the engine lubricant or another lubricating fluid (and an associated lubricant distribution system) would be used to lubricate the clutch 50. The pump 68 is an electrical pump, however it is contemplated that the pump 68 could be a different type of pump, such as a mechanical pump driven by the engine 28. The pump 68 continuously pumps hydraulic fluid from the reservoir 66 to the clutch 50. As hydraulic fluid is being supplied to the clutch 50 the pressure therein increases thus causing the piston 60 to overcome the bias of the spring 62 eventually causing the clutch 50 to become engaged so as to transmit torque from the engine 28 to the transmission 52. Opening the valve 70 relieves the pressure inside the clutch 50 and allows fluid to return to the reservoir 66 or the pump 68. Therefore, by controlling an opening and closing cycle of the valve 68 it is possible to control the hydraulic pressure inside the clutch 50. Since the spring constant of the springs 62 is known, it is therefore possible to control a position of the piston 60 of the clutch 50 as will be described in greater detail below. The valve 70 is an electrically controlled valve. The opening and closing cycle of the valve 70 is determined by a controller 200, discussed in greater detail below, which sends a pulse-width modulated (PWM) signal to the valve 70. It is contemplated that the valve 70 could be disposed between the pump 68 and the clutch 50 so as to selectively fluidly communicate the pump 68 with the clutch 50. It is also contemplated that the pump 68 could be a variable displacement pump, in which case it may be possible to eliminate the valve 70 and the hydraulic pressure inside the clutch 68 is effected by varying the displacement of the pump 68.

Figure 6:
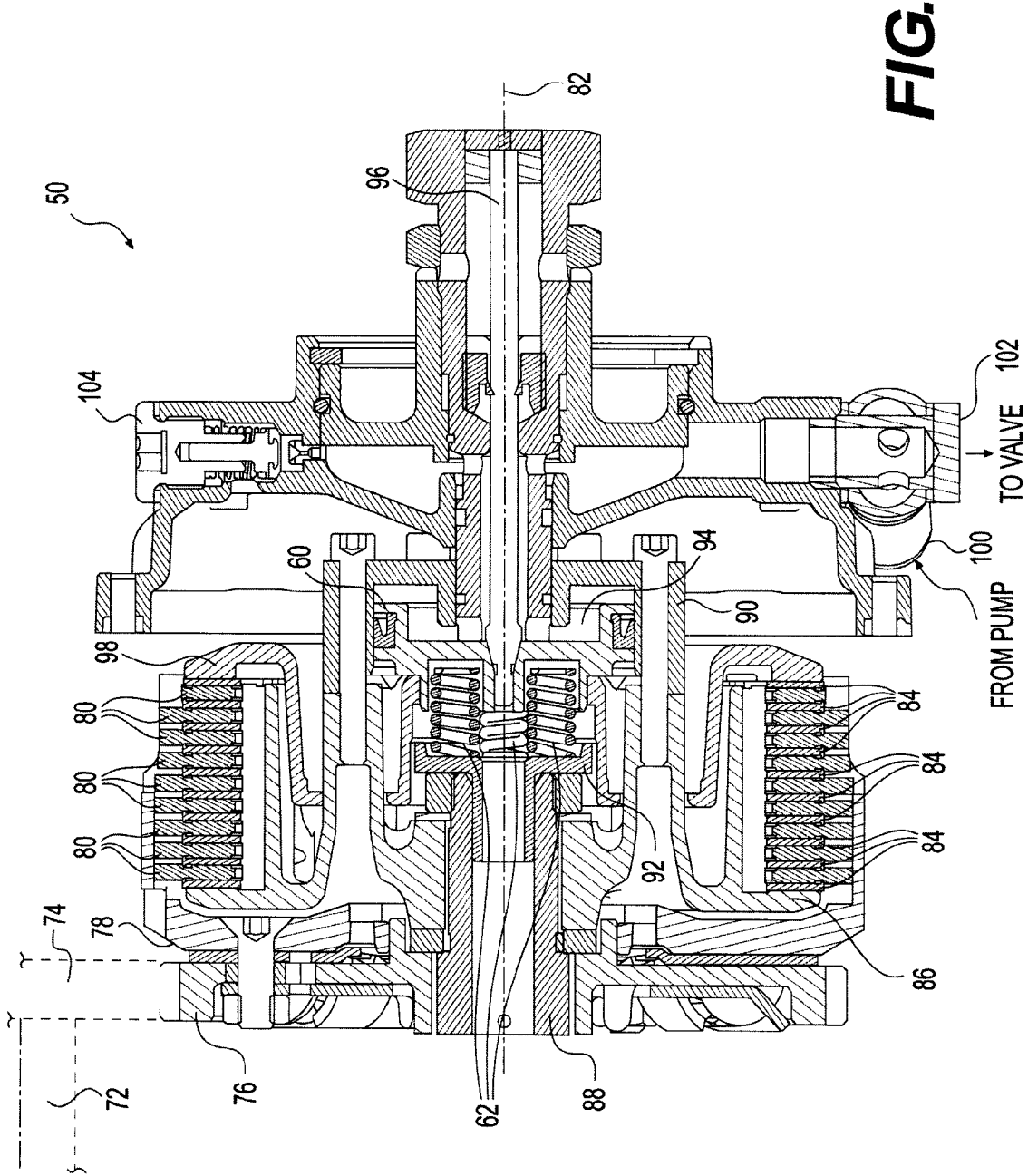
FIG. 6 is a cross-sectional view of the clutch of the vehicle of FIG. 1.

Turning now to FIG. 6, the clutch 50 will be described in more detail. The clutch 50 is driven by a crankshaft 72 of the engine 28. The crankshaft 72 has a gear 74 thereon which engages a ring gear 76 of the clutch 50. The ring gear 76 is fastened to a clutch drum 78 which rotates therewith. The clutch drum 78 receives therein a plurality of driving clutch plates 80. The driving clutch plates 80 are splined to the clutch drum 78 so as to rotate therewith, but can translate along the rotational axis 82 of the clutch 50. Driven clutch plates 84 are disposed inside the clutch drum 78 such that each driving clutch plate 80 is received between two driven clutch plates 84. The driven clutch plates 84 are splined onto a rotor 86 so as to transfer rotational motion to the rotor 86 when the clutch 50 is engaged. The clutch plates 84 can translate along the rotational axis 82. The rotor 86 does not move along the rotational axis 82. The rotor 86 is splined onto an output shaft 88 thus causing the output shaft 88 to rotate when the clutch 50 is engaged, thereby transferring torque from the engine 28 to the transmission 52.

A cover 90 is fastened to the rotor 86 so as to rotate therewith. An end plate 92 is mounted to the end of the output shaft 88 and rotates therewith. It is contemplated that the end plate could be omitted or integrally formed with the output shaft 88. The piston 60 is housed in the space formed between the cover 90, the rotor 86 and the end plate 92. Four springs 62 (only three of which are shown) are disposed between the end plate 92 and the piston 60. The springs 92 are coil springs, but it is contemplated that other types of springs could be used. It is also contemplated that more or less than four springs 62 could be used. The springs 62 bias the piston 60 away from the end plate 92 (i.e. toward the right in FIG. 6). A variable volume chamber 94 is formed between the piston and the cover 90. The piston 60 is mounted on a piston rod 96 and can translate along the rotational axis 82. The piston 60 abuts and selectively applies pressure to a pusher plate 98 which in turn selectively applies pressure to the clutch plates 80, 84 as will be described in greater detail below.

Figure 8:
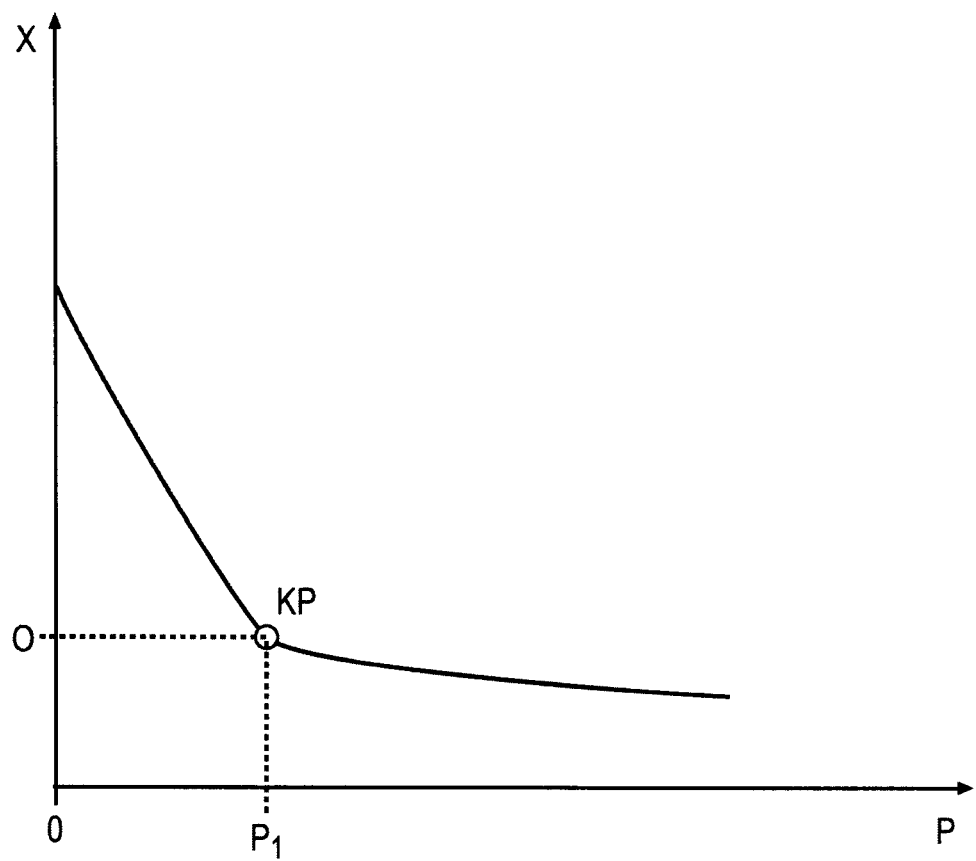
FIG. 8 is a graphical representation of a relationship between hydraulic pressure applied to the clutch and a position of a piston of the clutch used during a pre-launch mode.

Hydraulic fluid is supplied by the pump 68 via the clutch fluid inlet 100 and flows to the chamber 94. As discussed above, by opening and closing the valve 70, the hydraulic pressure in the chamber 94 can be controlled. Hydraulic fluid going to the valve 70 passes via the clutch fluid outlet 102. In case the hydraulic pressure inside the clutch 50 becomes too high, due to a failure of the valve 70 for example, a pressure relief valve 104 opens to prevent damage to the clutch 50 and/or the hydraulic fluid supply system 64. As the hydraulic pressure inside the chamber 94 is increased, the force applied to the piston 60 by the hydraulic fluid overcomes the bias of the springs 62 and the piston translates toward the end plate 92 (i.e. toward the left in FIG. 6). As the piston 60 translates, it moves the pusher plate 98 in the same direction. FIG. 8 illustrates the relationship between the hydraulic pressure inside the chamber 94 and the distance of the piston 60 to the clutch kiss-point (KP in FIG. 8). This relationship is used in the pre-launch mode 110. The clutch kiss-point is the point at which the clutch driving and driven plates 80, 84 start touching each other as a result of the pusher plate 98 pressing on the plates 80, 84. As can be seen in FIG. 8, until the piston 60 reaches the clutch kiss-point, the clutch 50 is disengaged and the relationship between the pressure in the chamber 94 and the position of the piston 60 is linear as a result of the linear response of the springs 62 being compressed (F=kx). Once the piston 60 reaches the clutch kiss-point, applying further pressure will result the clutch plates 80, 84 being compressed between the pusher plate 98 and the rotor 86, thus engaging the clutch 50, and transmitting rotational motion and torque from the driving clutch plates 80 to the driven clutch plates 84. As a result, the driven clutch plates 84 drive the rotor 86 which drives the output shaft 88. As can be seen in FIG. 8, increasing the pressure to the piston 60 once it has reached the clutch kiss-point continues to move the piston 60 but at a much slower rate. This displacement is a result of the clutch plates 80, 84 being compressed as a result of the pressure being applied to them. As would be understood, reducing the hydraulic pressure inside the chamber 94 causes the piston 60 and pusher plate 98 in the opposite direction according to the relationship illustrated in FIG. 8, eventually disengaging the clutch 50 once the clutch kiss-point is reached.

Figure 9:
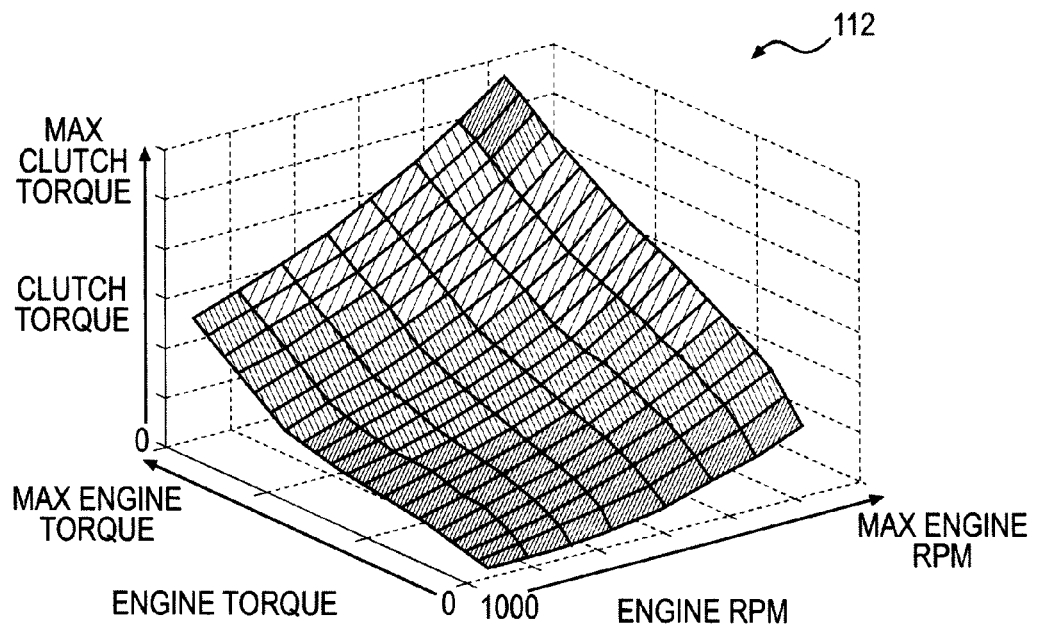
FIG. 9 illustrates a launch map.
Figure 10:
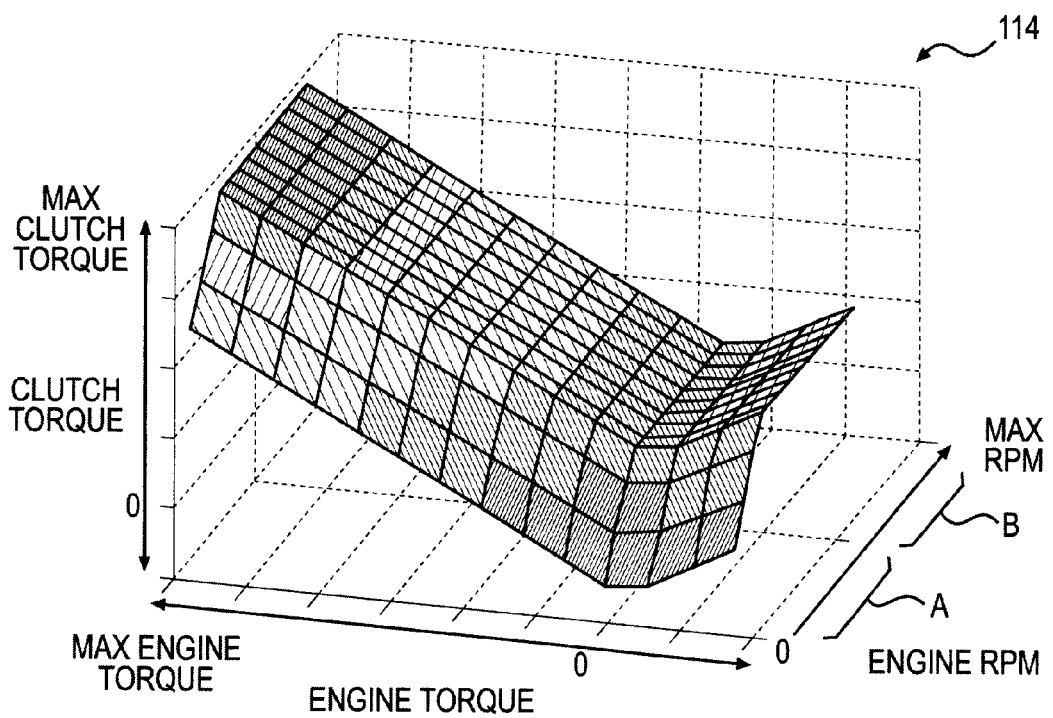
FIG. 10 illustrates a synchronized map.
Figure 12:
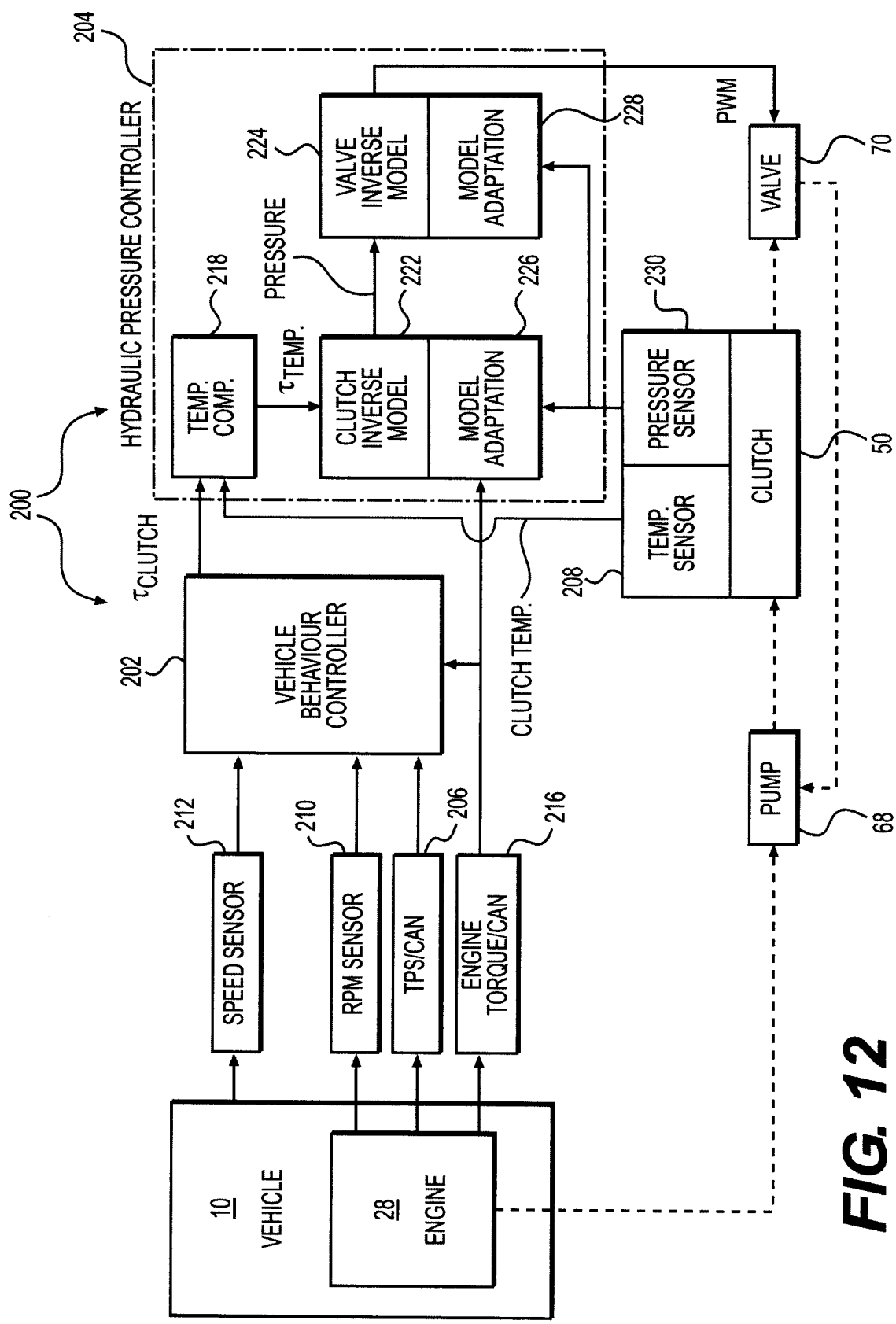
FIG. 12 is a schematic representation of a clutch control system.

The amount of hydraulic pressure to be applied to the clutch 50, and therefore the amount of torque being transmitted from the engine 28 to the rear wheel 30 by the clutch 50, is determined by the controller 200 which controls the opening and closing cycle of the valve 70. To do this, the controller 200 is divided into two controllers as shown in FIG. 12. These are the vehicle behaviour controller 202 and the hydraulic pressure controller 204. The vehicle behaviour controller 202 uses one of three clutch control maps/modes depending on the operating condition of the vehicle 10 and engine 28 to determine the clutch torque to be applied by the clutch 50 (i.e. the torque at the output shaft 88 of the clutch 50). These maps/modes are designed to provide a desired vehicle response to inputs by the driver of the vehicle 10. Depending on the type of vehicle, a more or less aggressive response may be desired. These maps/modes are designed independently from the specific components (clutch 50, valve 70) being used in the vehicle. The maps/modes are a pre-launch mode 110 an example of a relationship used thereby being shown in FIG. 8, a launch map 112 an example of which is shown in FIG. 9, and a synchronized map 114 an example of which is shown in FIG. 10. The clutch control map/mode selection method 150 used by the behaviour controller 202 will be described below with respect to FIG. 7. The hydraulic pressure controller 204 then takes the clutch torque determined by the behaviour controller 202 and determines the pulse-width modulated (PWM) signal to be applied to the valve 70 that will result in the appropriate hydraulic pressure being applied to the clutch 50 to obtain the desired clutch torque as will be described below with respect to FIG. 12.

Figure 7:
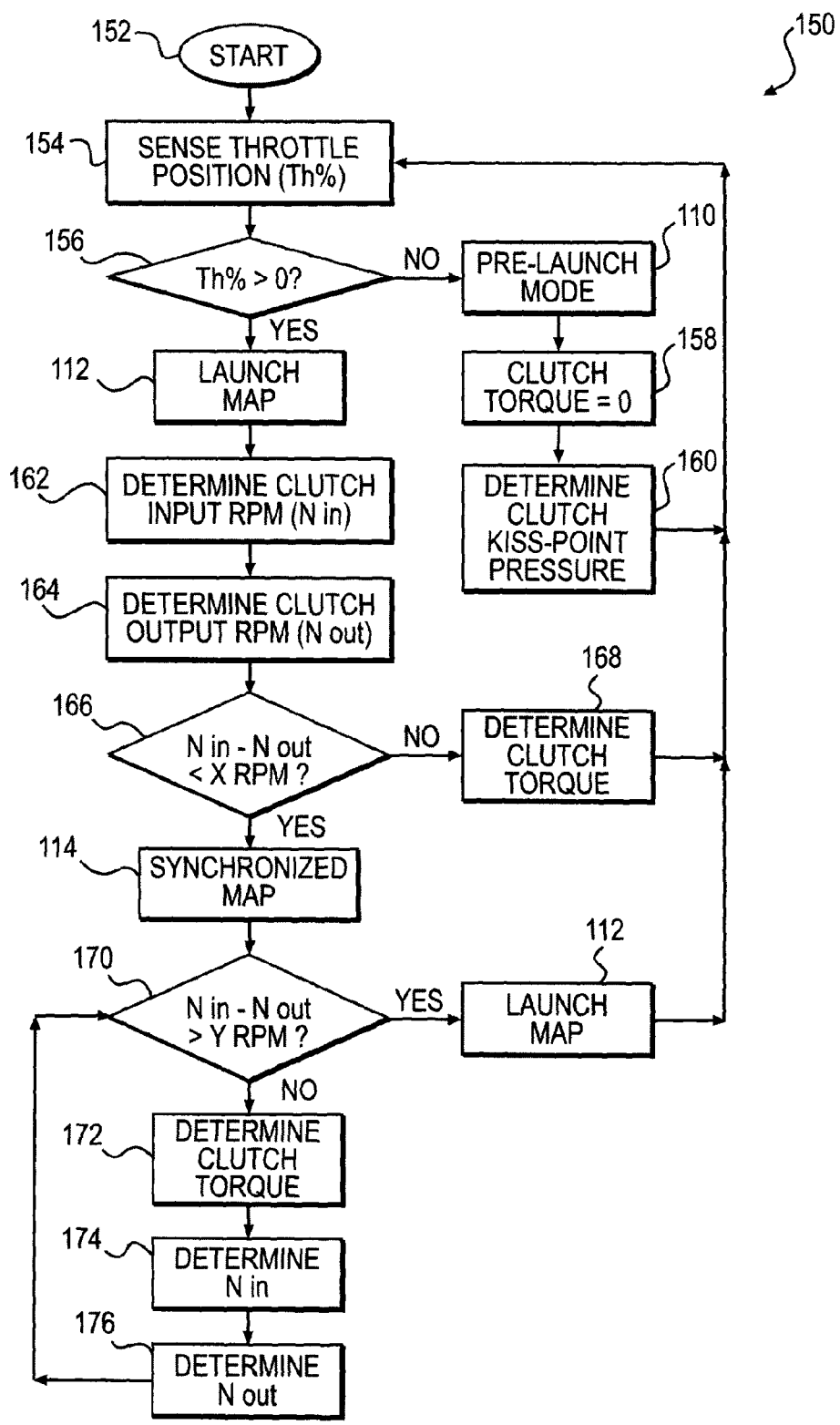
FIG. 7 is a logic diagram illustrating a clutch control map/mode selection method.

Turning now to FIG. 7, an exemplary embodiment of a clutch control map/mode selection method 150 used by the vehicle behaviour controller 202 will be described. The method 150 will be described in combination with FIG. 12 which illustrates the clutch control system. The method 150 is initiated at step 152. At step 154, a throttle position sensor 206 senses a position of the throttle lever 41. The throttle position sensor 204 sends a signal indicative of the throttle position to the vehicle behaviour controller 202. In the present embodiment, the throttle position is expressed in terms of percentage of actuation of the throttle lever 41 (Th %). When the throttle lever 41 is not actuated (Th %=0), the throttle lever is in what is known as an idle position. It is contemplated that the throttle position could be expressed as other units, such as angle of rotation of the throttle lever, or could be expressed as a unit less value. The throttle position sensor 204 sends the signal indicative of the throttle position via a controller area-network (CAN), but it is contemplated that other devices and communication protocols could be used.

At step 156, the vehicle behaviour controller 202 determines if the throttle lever 41 is actuated (Th %>0). If the throttle lever 41 is actuated, the vehicle behaviour controller 202 selects the launch map 112. If at step 156, the throttle lever 41 is at the idle position (i.e. not actuated, Th %=0), then the vehicle behaviour controller 202 selects the pre-launch mode 110.

If at step 156, the vehicle behaviour controller 202 selects the pre-launch mode 110, then at step 158, the vehicle behaviour controller 202 sets the desired clutch torque to 0 N m and the clutch 50 is disengaged. As described above, and as illustrated in FIG. 8, when the clutch 50 is disengaged there is a linear relationship between the pressure being applied to the clutch 50 and the position of the piston 60 of the clutch 50 (portion to the left of the clutch kiss-point KP in FIG. 8). As such, it is possible to determine the hydraulic pressure to be applied to the clutch 50 to bring the clutch 50 at the clutch kiss-point. This hydraulic pressure is defined herein as the kiss-point pressure. The vehicle behaviour controller 202 determines the kiss-point pressure using the pre-launch mode 110 at step 160. The hydraulic pressure controller 204 then makes any adjustments to the kiss-point pressure and determines the PWM signal to be applied to the valve 70 to supply the kiss-point pressure to the clutch 50. An example of an adjustment made by the hydraulic pressure controller 204 to the kiss-point pressure is with respect to the temperature of the hydraulic fluid. A hydraulic fluid temperature sensor 208 senses a temperature of the hydraulic fluid in the clutch 50 and sends a signal indicative of this temperature to the hydraulic pressure controller 204. It is contemplated that the hydraulic fluid temperature sensor 208 could be replaced by a different temperature sensor sensing the temperature of another engine fluid, such as the engine coolant, and that the hydraulic fluid temperature could be determined or at least estimated from the temperature sensed by this temperature sensor. As would be understood, as the temperature of the hydraulic fluid decreases, its viscosity increases. Therefore, as the temperature of the hydraulic fluid decreases, the hydraulic pressure necessary to move the piston 60 to a certain point also decreases. Therefore, as the hydraulic fluid temperature decreases, the hydraulic pressure controller 204 corrects the kiss-point pressure to be applied to the clutch 50 such that the clutch 50 does not transmit torque. By bringing the clutch 50 at the clutch kiss-point as described above, when the driver actuates the throttle lever 41, the vehicle response time is greatly reduced since the distance that the piston 60 has to travel to engage the clutch 50 is practically zero. It is also contemplated that the kiss-point pressure could be a hydraulic pressure to be supplied to the clutch 50 in order to bring the clutch 50 near the clutch kiss-point. From step 160, the method 150 resumes at step 154.

If at step 156 the vehicle behaviour controller 202 selects the launch map 112, then at step 162 the vehicle behaviour controller 202 determines the input rotational speed of the clutch 50 (N in), which corresponds to the speed of rotation of the driving clutch plates 80. In the present embodiment, the vehicle behaviour controller 202 does this by receiving a signal from an engine speed sensor 210 sensing a speed of rotation of the engine 28 (i.e. the speed of rotation of the crankshaft 72). Since the ratio of the gears 74 and 76 is known, the vehicle behaviour controller 202 can derive the input rotational speed of the clutch 50 from the engine speed. It is contemplated that the input rotational speed of the clutch 50 could be determined by other means, such as by sensing a speed of rotation of the ring gear 76 or clutch drum 78 directly. Then at step 164 the vehicle behaviour controller 202 determines the output rotational speed of the clutch 50 (N out), which corresponds to the speed of rotation of the driven clutch plates 84 and of the output shaft 88. In the present embodiment, the vehicle behaviour controller 202 does this by receiving a signal from a speed sensor 212 sensing a speed of rotation of the shaft 214 (FIG. 4) driving the rear wheel 30. Since the ratio of the rotational speeds of the output shaft 88 and the shaft 214 is known, the vehicle behaviour controller 202 can derive the output rotational speed of the clutch 50 from the speed of the shaft 214. It is contemplated that the output rotational speed of the clutch 50 could be determined by other means, such as by sensing a speed of rotation of the output shaft 88 directly or by sensing a speed of rotation of one of the sprockets 54 and 56.

At step 166, the vehicle behaviour controller 202 then compares the input rotational speed of the clutch 50 to the output rotational speed of the clutch 50 and determines if the difference between these two values is less than a first predetermined value (X RPM). In an exemplary embodiment, the first predetermined value is 50 RPM. If the difference is greater than or equal to the first predetermined value, then the vehicle behaviour controller 202 moves to step 168 and determines the clutch torque to be applied by the clutch 50 using the launch map 112. The clutch torque is determined from the engine torque and the engine speed (engine RPM). As shown in FIG. 9, as the engine speed and engine torque increase, the desired clutch torque increases as well. The engine speed is determined by the engine speed sensor 210 as described above. The engine torque is determined by using an engine torque map 216 having engine speed and position of the throttle lever 41 as inputs. A signal indicative of the engine torque is sent to the vehicle behaviour controller 202 via CAN, but it is contemplated that other devices and communication protocols could be used. It is contemplated that the engine torque could be determined by any other means. For example, instead of using the torque map 216, an engine control module or the vehicle behaviour controller 202 could calculate the engine torque from the engine speed and the position of the throttle lever 41. In another example, the engine torque could be measured using a torque sensor measuring the torque at the crankshaft 72 of the engine 28. The clutch torque is then entered into the hydraulic pressure controller 204 to determine the PWM signal to be applied to the valve as described in greater detail below. While the launch map 112 is being used, the driving clutch plates 80 and the driven clutch plates 84 do not rotate at the same speed and slip relative to each other. From step 168, the method 150 resumes at step 154.

If a step 166 the difference between the input rotational speed of the clutch 50 and the output rotational speed of the clutch 50 is less than the first predetermined value, then the vehicle behaviour controller 202 selects the synchronized map 114. Then at step 170, the vehicle behaviour controller 202 compares the input rotational speed of the clutch 50 to the output rotational speed of the clutch 50 and determines if the difference between these two values is greater than a second predetermined value (Y RPM). In the present embodiment, the second predetermined value is greater than the first predetermined valued, however it is contemplated that they could be the same. In an exemplary embodiment, the second predetermined value is 100 RPM. If the difference is less than or equal to the second predetermined value, then the vehicle behaviour controller 202 moves to step 172 and determines the clutch torque to be applied by the clutch 50 using the synchronized map 114. The desired clutch torque is determined from the engine torque and the engine speed in the same manner as described above with respect to step 168. As can be seen in FIG. 10, the synchronized map 114 has two main portions: portion A and portion B. In portion A, the clutch torque varies in response to both engine torque and engine speed. Also, in portion A, for at least some engine speed and engine torque combinations, the driving and driven clutch plates 80, 84 slip relative to each other. In portion B, the clutch torque varies only in response to engine torque. It is contemplated however that the clutch torque could also vary in response to engine speed in portion B. Also, in portion B, the driving and driven clutch plates 80, 84 rotate at the same speed and are said to be synchronized (hence the name of map 114). The clutch torque is then entered into the hydraulic pressure controller 204 to determine the PWM signal to be applied to the valve as described in greater detail below.

From step 172, the vehicle behaviour controller 202 moves to step 174 where the vehicle behaviour controller 202 determines the input rotational speed of the clutch 50 in the same manner as in step 162 described above. From step 174, the vehicle behaviour controller 202 moves to step 176 where the vehicle behaviour controller 202 determines the output rotational speed of the clutch 50 in the same manner as in step 164 described above. From step 176, the vehicle behaviour controller returns to step 170. As would be understood, steps 172 to 176 will continue to be repeated, and the desired clutch torque will continue to be determined using the synchronized map 114, until the vehicle behaviour controller 202 determines at step 170 that the difference between the input rotational speed of the clutch 50 and the output rotational speed of the clutch 50 is greater than the second predetermined value.

If at step 170, the vehicle behaviour controller 202 determines that the difference between the input rotational speed of the clutch 50 and the output rotational speed of the clutch 50 is greater than the second predetermined value, then the vehicle behaviour controller selects the launch map 112 and the method 150 resumes at step 154.

Figure 11A:
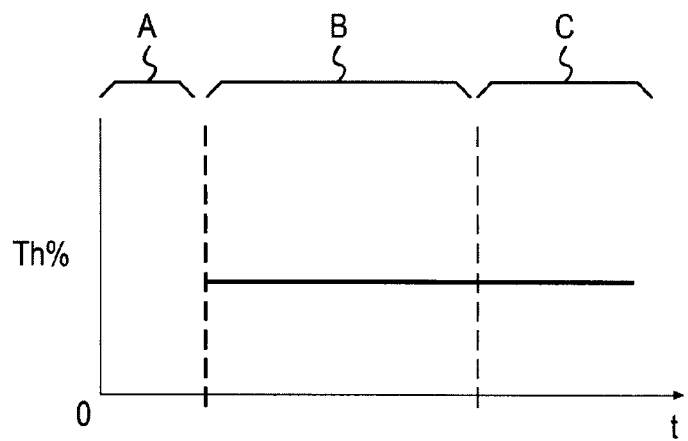
FIGS. 11A to 11C illustrate changes over time of the throttle position, engine speed and vehicle speed respectively.
Figure 11B:
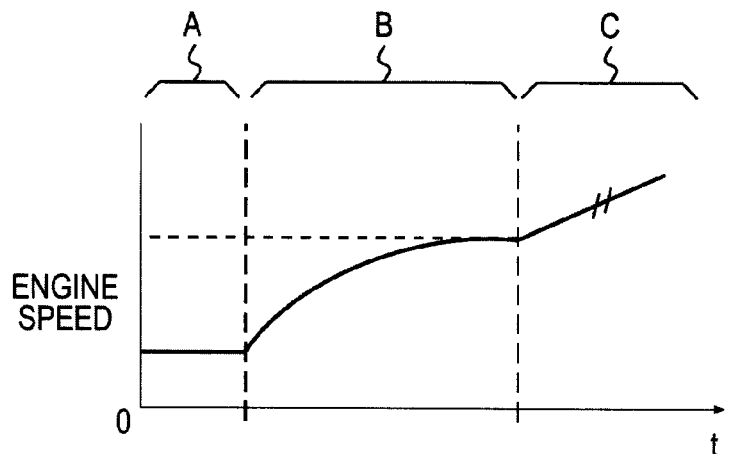
Figure 11C:
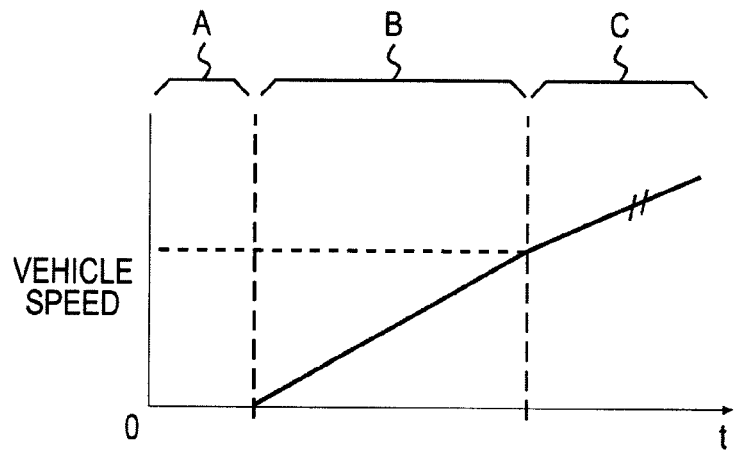

Turning now to FIGS. 11A to 11C, the change in engine speed over time (FIG. 11B) resulting from a change in throttle position (FIG. 11A) and the change in vehicle speed (FIG. 11C) resulting from the change in throttle position and change in engine speed (and therefore of engine torque) using the method 150 of FIG. 7 will be discussed. As can be seen in FIG. 11C, the vehicle start from rest. During time period A, the throttle lever 41 is at the idle position (Th %=0), the engine 28 is running at a constant idle speed and the vehicle 10 remains at rest. As such, during time period A, the vehicle behaviour controller 202 is in the pre-launch mode 110 and the clutch 50 is set at the clutch kiss-point. Then during time period B, the throttle lever 41 is actuated and kept at a constant position as can be seen in FIG. 11A. As can be seen from FIG. 11 this results in the engine speed increasing non-linearly. During time period B, the difference in speed between the input rotational speed of the clutch 50 and the output rotational speed of the clutch 50 is greater than the first predetermined value (i.e. X RPM). As such, the vehicle behaviour controller 202 uses the launch map 112. This results in a generally linear increase in the vehicle speed. As the engine speed and engine torque increase during the time period B, the clutch torque increases, thus reducing the difference in speed between the input rotational speed of the clutch 50 and the output rotational speed of the clutch 50. At the end of time period B, the difference in speed between the input rotational speed of the clutch 50 and the output rotational speed of the clutch 50 is less than the first predetermined value and the vehicle behaviour controller 202 switches to the synchronized map 114. During time period C, the throttle lever 41 is maintained at the same position as in time period B, and the engine speed increases linearly. As a result of using the synchronized map 114, the vehicle speed continues to increase.

FIGS. 11A to 11C illustrate only one scenario resulting from the use of the method 150 of FIG. 7 and the maps/modes 110, 112, and 114. It should be understood that depending on the calibration of the maps/modes 110, 112, and 114, the resulting vehicle speed response may be different from the one illustrated in FIG. 11C. For example the vehicle speed could not increase linearly in either one or both of time periods B and C.

Turning now to FIG. 12, the hydraulic pressure controller 204 will be described in more detail. As previously described, the hydraulic pressure controller 204 takes the desired clutch torque determined as described above by the vehicle behaviour controller 202 and determines based on the clutch torque the PWM signal to be sent to the valve 70 that will result in the correct hydraulic pressure being applied to the clutch 50 to obtain this clutch torque. The hydraulic pressure controller 204 includes a hydraulic fluid temperature clutch torque compensation component 218, a clutch inverse model 222, a valve inverse model 224, and adaptation components 226, 228 for the models 222 and 224 respectively.

Figure 13:
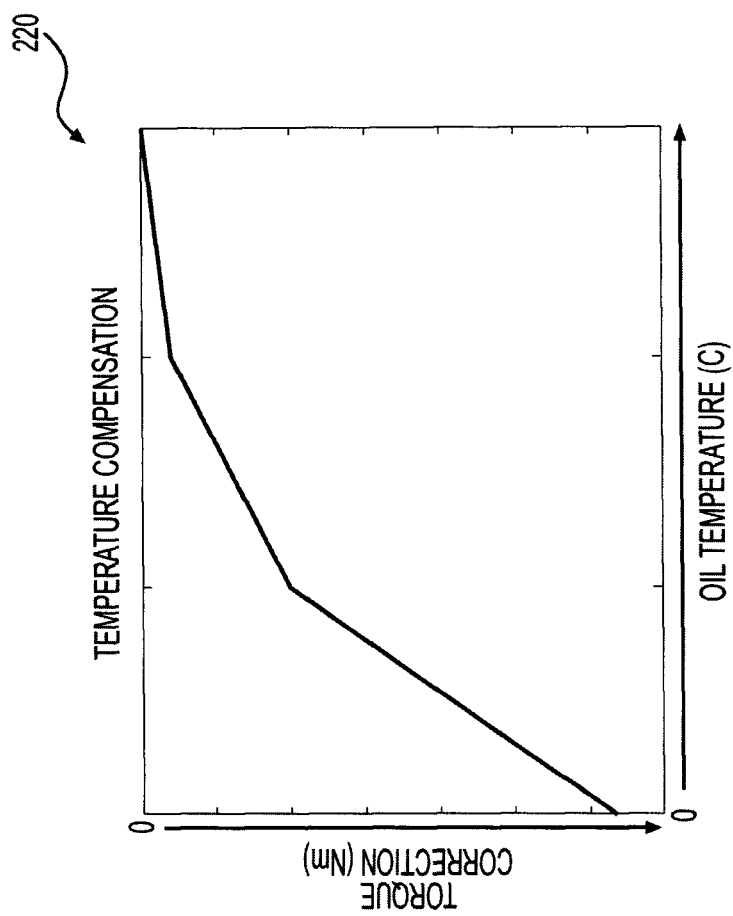
FIG. 13 is a graphical representation of a clutch torque correction in function of hydraulic fluid temperature.

As previously described, as the temperature of the hydraulic fluid decreases, its viscosity increases and a lower pressure can be applied to the clutch 50 to obtain the same result as at a higher temperature. Therefore, to take this into account, the hydraulic fluid temperature clutch torque compensation component 218 makes a correction to the clutch torque determined by the vehicle behaviour controller 202 by reducing the clutch torque that will be used to determine the PWM signal. FIG. 13 illustrates an exemplary graphical representation 220 of a clutch torque correction in function of hydraulic fluid temperature. As can be seen, the lower the hydraulic fluid temperature is, the greater is the amount by which the clutch torque determined by the vehicle behaviour controller 202 will be reduced (note that the torque correction values are negative).

The corrected clutch torque value obtained from the compensation component 218 is then input into the clutch inverse model 222. The clutch inverse model 222 is the inverse function of a mathematical representation of the physical behaviour of the clutch 50 (i.e. the inverse of a clutch model). The clutch model can be obtained through experimentation for example, by determining the clutch torques resulting from various hydraulic pressures being supplied to the clutch 50. The clutch inverse model 222 is the inverse mathematical function of the clutch model and as such allows the hydraulic pressure controller 204 to determine the hydraulic pressure to be applied to the clutch 50 to obtain a desired clutch torque. It is contemplated that the clutch inverse model 222 could also be in the form of a lookup table or map. Therefore, the clutch inverse model 222 determines the hydraulic pressure to be supplied to the clutch 50 to obtain the corrected clutch torque value obtained from the compensation component 218. The clutch inverse model 222 is associated with the adaptation component 226. The adaptation component 226 updates/modifies the clutch inverse model 222 to take into account changes in the behaviour of the clutch 50 over time resulting from wear of the clutch 50 and/or to take into account differences between the clutch 50 being used in the vehicle 10 and the clutch 50 used to make the clutch inverse model 222 that result from manufacturing tolerance (i.e. two clutches of the same model may not behave exactly in the same manner). Therefore the adaptation component 226 insures that the hydraulic pressure determined by the clutch inverse model 222 will provide the correct clutch torque. The adaptation component 226 uses the engine torque 216 and the actual hydraulic pressure in the clutch 50 sensed by a hydraulic pressure sensor 230 to determine if and how the clutch inverse model 222 needs to be updated or modified. In an alternative embodiment, the adaptation component 226 applies a correction factor to the pressure obtained from the clutch inverse model 222 instead of updating or modifying the clutch inverse model 222.

The hydraulic fluid pressure value obtained from the clutch inverse model 222 is then input into the valve inverse model 224. The valve inverse model 224 is the inverse function of a mathematical representation of the physical behaviour of the valve 70 operating in combination with the pump 68 and the clutch 50 (i.e. the inverse of a valve model). The valve model can be obtained through experimentation for example, by determining the hydraulic fluid pressure resulting from various PWM signals being applied to the valve 70 being used with the clutch 50 and the pump 68. The valve inverse model 224 is the inverse mathematical function of the valve model and as such allows the hydraulic pressure controller 204 to determine the PWM signal to be applied to the valve 70 to obtain a desired hydraulic fluid pressure. It is contemplated that the valve inverse model 224 could also be in the form of a lookup table or map. Therefore, the valve inverse model 224 determines the PWM signal to be applied to the valve 70 to obtain the hydraulic fluid pressure value obtained from the clutch inverse model 222. The valve inverse model 224 is associated with the adaptation component 228. The adaptation component 228 updates/modifies the valve inverse model 224 to take into account changes in the behaviour of the valve 70 (and pump 68) over time resulting from wear of the valve 70 (and pump 68) and/or to take into account differences between the valve 70 (and pump 68) being used in the vehicle 10 and the valve 70 (and pump 68) used to make the valve inverse model 224 that result from manufacturing tolerance (i.e. two valves/pump of the same model may not behave exactly in the same manner). Therefore the adaptation component 228 insures that the PWM signal determined by the valve inverse model 224 will provide the correct hydraulic fluid pressure to the clutch 50. The adaptation component 228 uses the actual hydraulic pressure in the clutch 50 sensed by the hydraulic pressure sensor 230 and compares it to the desired hydraulic fluid pressure determined by the clutch inverse model 222 to determine if and how the valve inverse model 224 needs to be updated or modified. In an alternative embodiment, the adaptation component 228 applies a correction factor to the PWM signal obtained from the valve inverse model 224 instead of updating or modifying the valve inverse model 224.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
   an engine having a crankshaft;
   a hydraulically controlled multi-plate clutch operatively connected to the crankshaft, the clutch including at least one driving clutch plate and at least one driven clutch plate;
   an output shaft operatively connected to the clutch, the clutch selectively transmitting power from the crankshaft to the output shaft;
   a propulsion element operatively connected to the output shaft;
   a hydraulic fluid supply system fluidly connected to the clutch for supplying pressurized hydraulic fluid to the clutch;
   a controller connected to the hydraulic fluid supply system, the controller receiving a torque signal indicative of engine torque and controlling the hydraulic fluid supply system based at least in part on the torque signal in a launch mode and in a synchronized mode;
   an engine speed sensor sensing a speed of the engine, the engine speed sensor being connected to the controller for sending an engine speed signal indicative of engine speed to the controller, the controller controlling the hydraulic fluid supply system based at least in part on the engine speed signal in the launch mode and in the synchronized mode; and
   a throttle position sensor sensing a position of a throttle lever of the vehicle,
   wherein, when the throttle lever is actuated:
      the controller controls the hydraulic fluid supply system in the launch mode when a difference between a speed of rotation of the at least one driving clutch plate and a speed of rotation of the at least one driven clutch plate is greater than a first predetermined amount; and
      the controller controls the hydraulic fluid supply system in the synchronized mode when the difference between the speed of rotation of the at least one driving clutch plate and the speed of rotation of the at least one driven clutch plate is less than the first predetermined amount;
   wherein in the launch mode the at least one driving clutch plate and the at least one driven clutch plate slip relative to each other; and
   wherein in the synchronized mode the at least one driving clutch plate and the at least one driven clutch plate rotate together at a same speed of rotation for at least some engine torque and engine speed combinations.

2. The vehicle of claim 1, further comprising a transmission operatively connecting the output shaft to the propulsion element.

3. The vehicle of claim 1, wherein the propulsion element is a wheel.

4. The vehicle of claim 1, wherein the hydraulic fluid supply system includes a hydraulic fluid pump and a valve.

5. The vehicle of claim 4, wherein the controller controls an opening and closing cycle of the valve.

6. The vehicle of claim 1, wherein the hydraulically controlled multi-plate clutch includes at least one spring biasing the clutch toward an open position.

7. The vehicle of claim 6, further comprising a throttle position sensor sensing a position of a throttle lever of the vehicle;
   wherein when an input rotational speed of the clutch is greater than an output rotational speed of the clutch and the position of the throttle lever is an idle position, the controller controls the hydraulic fluid supply system such that the clutch is at or near a clutch kiss-point.

8. The vehicle of claim 7, further comprising a hydraulic fluid temperature sensor sensing a temperature of the hydraulic fluid, the temperature sensor being connected to the controller for sending a hydraulic fluid temperature signal indicative of the temperature of the hydraulic fluid to the controller;
   wherein, to cause the clutch to be at or near the clutch kiss-point, the controller causes the hydraulic fluid supply system to supply hydraulic fluid to the clutch at a first pressure when the temperature of the hydraulic fluid is a first temperature and causes the hydraulic fluid supply system to supply hydraulic fluid to the clutch at a second pressure when the temperature of the hydraulic fluid is a second temperature; and wherein the second temperature is lower than the first temperature and the second pressure is lower than the first pressure.

9. The vehicle of claim 1, wherein once the controller controls the hydraulic fluid supply system in the synchronized mode, the controller continues to control the hydraulic fluid system in the synchronized mode until the difference between the speed of rotation of the at least one driving clutch plate and the speed of rotation of the at least one driven clutch plate is greater than a second predetermined amount; and wherein the second predetermined amount is greater than the first predetermined amount.

10. A method of operating a hydraulically controlled multi-plate clutch selectively transmitting torque from an engine of a vehicle to a propulsion element of the vehicle, the clutch including at least one driving clutch plate and at least one driven clutch plate, the method comprising:

determining an engine torque;
determining an engine speed;
determining a clutch torque to be transferred by the clutch based at least in part on the engine torque and the engine speed, including:
  determining the clutch torque by inputting the engine torque and engine speed in a launch map when a difference between a speed of rotation of the at least one driving clutch plate and a speed of rotation of the at least one driven clutch plate is greater than a first predetermined amount; and
  determining the clutch torque by inputting the engine torque and engine speed in a synchronized map when the difference between the speed of rotation of the at least one driving clutch plate and the speed of rotation of the at least one driven clutch plate is less than the first predetermined amount;
determining a hydraulic pressure to be applied to the clutch based on the clutch torque; and
applying the hydraulic pressure to the clutch,
when using the launch map, applying the hydraulic pressure to the clutch results in the at least one driving clutch plate of the clutch and at least one driven clutch plate of the clutch slipping relative to each other; and
when using the synchronized map, applying the hydraulic pressure to the clutch results in the at least one driving clutch plate and the at least one driven clutch plate rotating together at a same speed of rotation for at least some engine torque and engine speed combinations.

11. The method of claim 10, wherein once the clutch torque has been determined using the synchronized map, the clutch torque continues to be determined using the synchronized map until the difference between the speed of rotation of the at least one driving clutch plate and the speed of rotation of the at least one driven clutch plate is greater than a second predetermined amount; and wherein the second predetermined amount is greater than the first predetermined amount.

12. The method of claim 10, further comprising:
determining a position of a throttle lever of the vehicle;
determining an input rotational speed of the clutch;
determining an output rotational speed of the clutch; and
supplying a kiss-point pressure to the clutch such that the clutch is at or near a clutch kiss-point when the input rotational speed of the clutch is greater than the output rotational speed of the clutch and the position of the throttle lever is an idle position.

13. The method of claim 12, further comprising:
sensing a hydraulic fluid temperature; and
determining the kiss-point pressure based on the hydraulic fluid temperature such that the kiss-point pressure decreases as the hydraulic fluid temperature decreases.

14. The method of claim 10, wherein determining the hydraulic pressure includes inputting the clutch torque in an inverse model of the clutch.

15. The method of claim 10, wherein supplying the hydraulic pressure to the clutch includes controlling an opening and closing cycle of a valve disposed downstream of a hydraulic fluid pump supplying hydraulic fluid to the clutch.

16. The method of claim 15, further comprising determining a pulse-width modulated signal to be applied to the valve by inputting the hydraulic pressure in an inverse model of the valve; and wherein controlling the opening and closing cycle of the valve includes applying the pulse-width modulated signal to the valve.

17. The method of claim 16, wherein determining the pulse-width modulated signal includes:
comparing an actual hydraulic pressure to the hydraulic pressure input into the inverse model of the valve; and
adapting the inverse model of the valve when the actual hydraulic pressure differs from the hydraulic pressure input into the inverse model of the valve.

18. A control system for operating a hydraulically controlled multi-plate clutch selectively transmitting torque from an engine of a vehicle to a propulsion element of the vehicle, the clutch including at least one driving clutch plate and at least one driven clutch plate, the system comprising:

a vehicle behaviour controller determining a desired clutch torque to be applied to the clutch based at least in part on engine torque and at least in part on engine speed, the vehicle behaviour controller including a launch map and a synchronized map,
the vehicle behaviour controller using the launch map with the engine torque and the engine speed when a difference between a speed of rotation of the at least one driving clutch plate and a speed of rotation of the at least one driven clutch plate is greater than a first predetermined amount,
the vehicle behaviour controller using the synchronized map with the engine torque and the engine speed when the difference between the speed of rotation of the at least one driving clutch plate and the speed of rotation of the at least one driven clutch plate is less than the first predetermined amount; and
a hydraulic pressure controller determining a control signal to be sent to a hydraulic fluid supply system to control the hydraulic fluid supply system to supply hydraulic fluid to the clutch at a pressure resulting in the desired clutch torque being provided by the clutch, the hydraulic fluid supply system including a hydraulic fluid pump and a valve, the control signal being determined based on the desired clutch torque and an inverse model of at least one of the clutch and the valve,
when using the launch map, the at least one driving clutch plate of the clutch and the at least one driven clutch plate of the clutch slip relative to each other, and
when using the synchronized map, the at least one driving clutch plate and the at least one driven clutch plate rotate together at a same speed of rotation for at least some engine torque and engine speed combinations.

19. The system of claim 18, wherein the control signal is also determined based on an adaptation component of the hydraulic pressure controller, the adaptation component adapting the inverse model of the at least one of the clutch and the valve.

20. The system of claim 18, wherein the vehicle behaviour controller includes a pre-launch mode;
    wherein the vehicle behaviour controller enters the pre-launch mode when the speed of rotation of the at least one driving clutch plate is greater than the speed of rotation of the at least one driven clutch plate and a throttle lever of the vehicle is in an idle position;
    wherein, when in the pre-launch mode, the clutch is controlled to be at or near a clutch kiss-point.

21. The system of claim 20, wherein a hydraulic pressure to be applied to the clutch such that the clutch is at or near the clutch kiss-point is modified based on a hydraulic fluid temperature.

\* \* \* \* \*